United States Patent [19]
Schleicher et al.

[11] Patent Number: 5,465,869
[45] Date of Patent: Nov. 14, 1995

[54] GARDEN SEEDER

[76] Inventors: Israel D. Schleicher, 10901 Bahia Ct., Bakersfield, Calif. 93311; Yaacov Schleicher, 2701 S. Fairview St. #P-3, Santa Ana, Calif. 92704

[21] Appl. No.: 276,537

[22] Filed: Jul. 18, 1994

[51] Int. Cl.[6] .................................................. A01C 7/04
[52] U.S. Cl. ..................... 221/185; 221/3; 221/211; 221/254; 111/50; 111/72; 111/78
[58] Field of Search ................................ 221/3, 185, 211, 221/237, 254, 265, 266, 277; 111/25, 50, 59, 71, 72, 73, 77, 78, 79, 913, 914

[56] References Cited

U.S. PATENT DOCUMENTS

| | | | |
|---|---|---|---|
| 2,525,718 | 10/1950 | Parker | 221/211 |
| 2,986,305 | 5/1961 | Koerper et al. | 221/185 X |
| 4,009,799 | 3/1977 | Fathauer | 221/3 |
| 4,163,507 | 8/1979 | Bell | 221/2 |
| 4,239,126 | 12/1980 | Dobson et al. | 221/211 |
| 4,315,580 | 2/1982 | Beckworth | 221/185 |
| 4,369,895 | 1/1983 | McCarty et al. | 221/3 |

FOREIGN PATENT DOCUMENTS

| | | | |
|---|---|---|---|
| 686652 | 10/1979 | U.S.S.R. | 221/3 X |

*Primary Examiner*—William E. Terrell
*Assistant Examiner*—Dean A. Reichard

[57] ABSTRACT

A tool for depositing seed uniformly along a prepared furrow. The tool uses the rolling motion of a ground engaging wheel to drive a seed pickup and delivery mechanism. A pickup wheel which is coupled to the ground engaging wheel contacts the seeds via a slot in the seed container. A suction force created by an oscillating bellow is channeled to a pickup aperture in the circumference of the pickup wheel. Picked seed is carried by the pickup wheel to a guiding duct to be released and delivered to the soil. The tool also includes an electronic monitor that produces a short audible beep for every deposited seed.

4 Claims, 4 Drawing Sheets

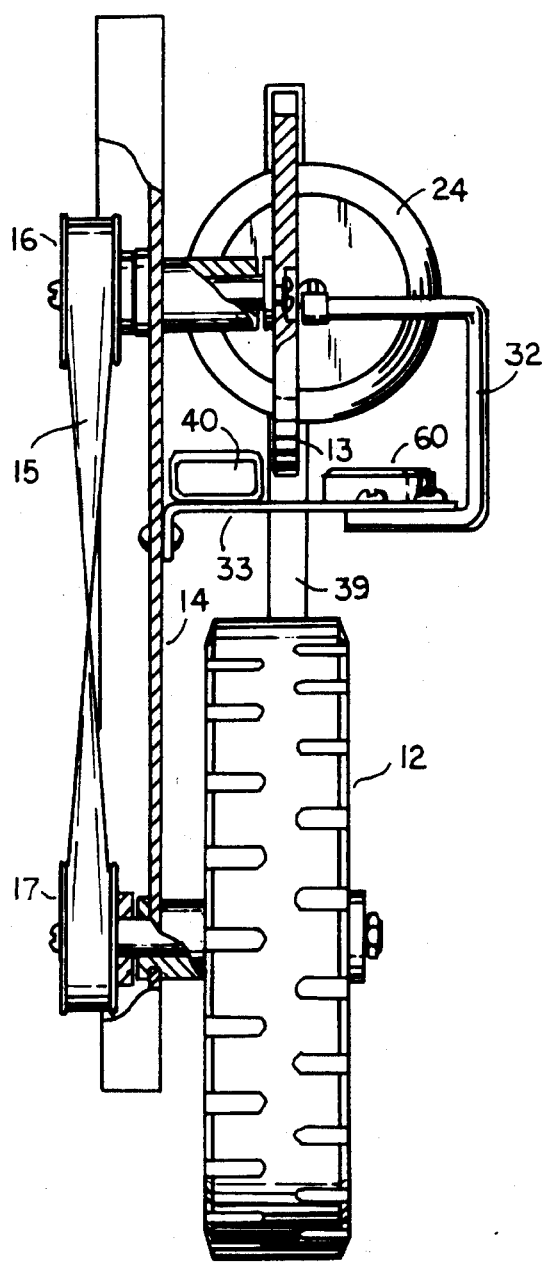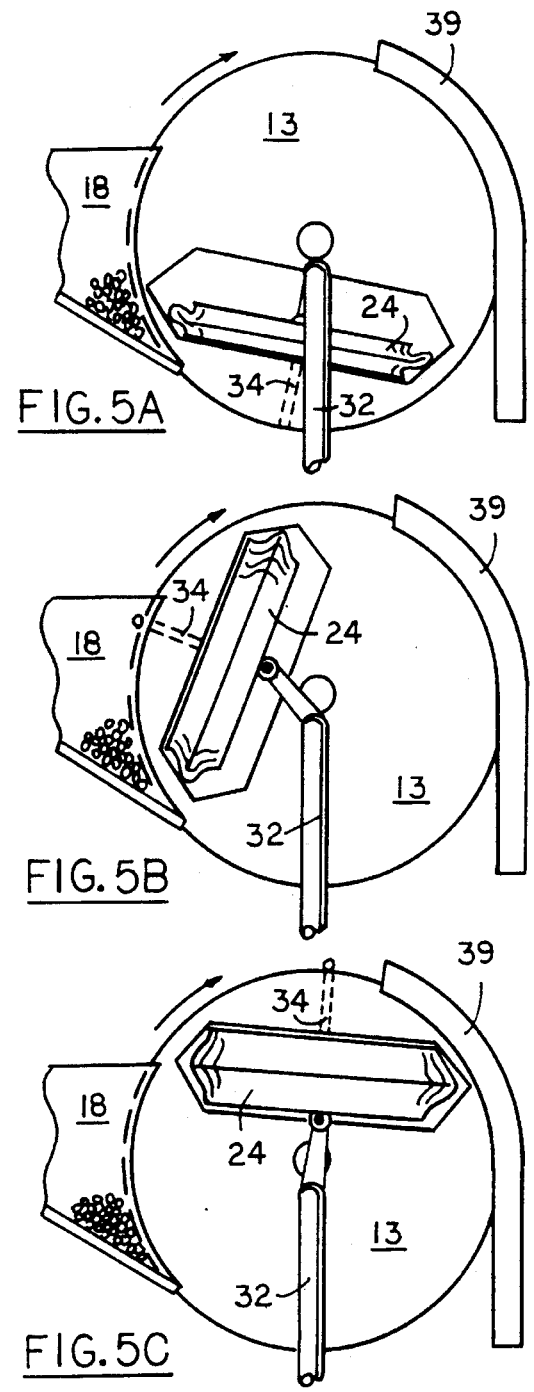

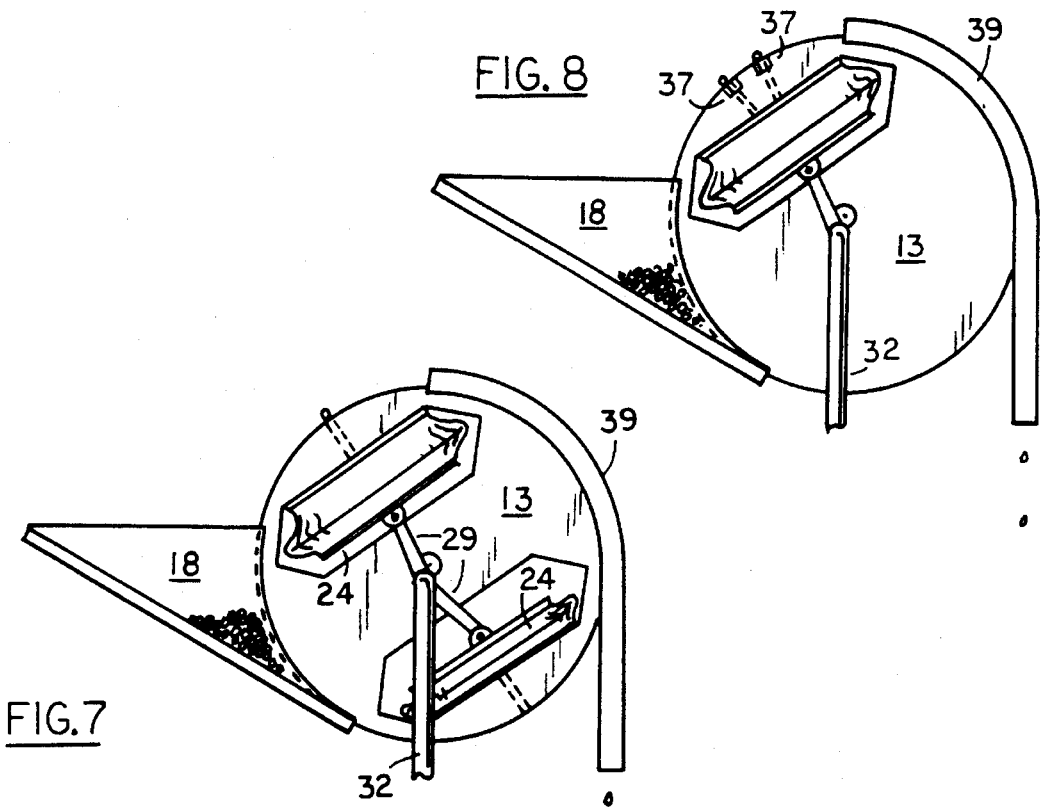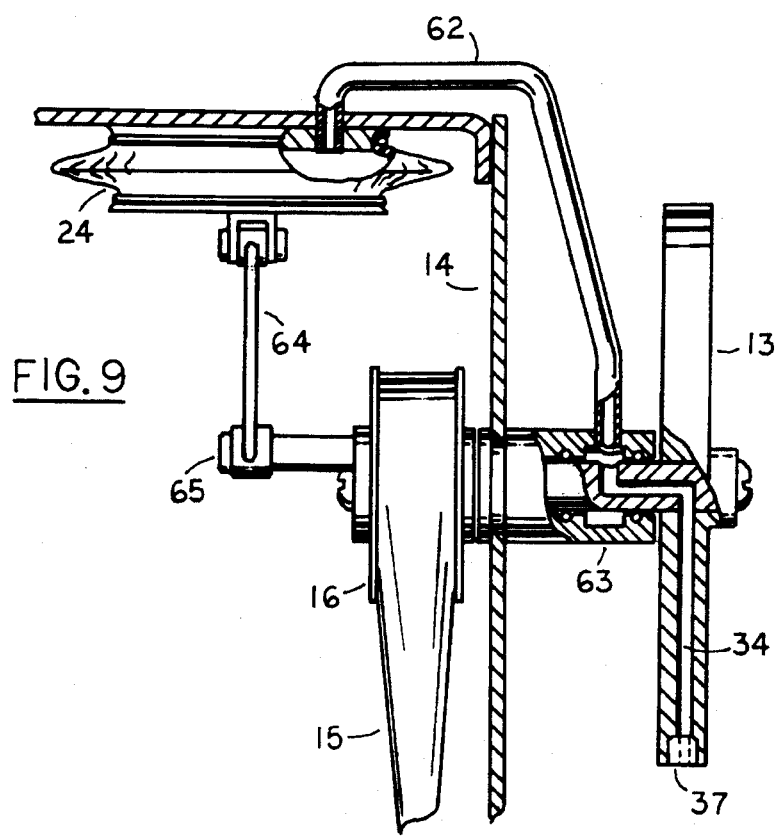

GARDEN SEEDER

FIELD OF THE INVENTION

This invention relates to seed dispensing tools, specifically to such tools using vacuum suction for seed pickup.

BACKGROUND AND PRIOR ART

In the operation of seeding, seeds are transferred from a hopper and deposited uniformly in the soil. In one type of seeding machines the seeds are pulled by gravity through a flow control mechanism attached to the bottom of the hopper. This mechanism consists of a set of two plates: one plate, having a plurality of holes sized slightly larger than the seed, is made to rotate at a rate proportional to the seed discharge rate. Seeds fall into these holes and are trapped in place by a stationary plate placed below the rotating plate and having a single discharge opening. As the first plate rotates it carries the trapped seeds toward the opening in the stationary plate. The seeds then gravitates towards the soil. These types of machines are only suitable for large and uniform size seeds. An adaptation of this type of machine for use in small scale gardening is described by Beckworth in U.S. Pat. No. 4,315,580. For the purpose of sowing small or nonuniform size seeds, the power of air flow or of vacuum suction is employed. Dobson et al in U.S. Pat. No. 4,239,126 describe such a machine: the round portion of a rotating drum fits closely against the opening of a seed hopper thus making contact with the seeds. The portion of the circumference of the drum which contacts the seeds has a plurality of holes having a size smaller than the seed. Vacuum suction is applied to the drum via the center of its pivot. The suction force draws seeds towards the holes in the drum. Consequently, the holes are plugged up with seeds. If the size of the holes and the power of the vacuum is chosen properly, only one seed is picked up by each hole. As the drum rotates the picked seed is carried up, then out of the hopper and then down. A wheel which is mounted on a separate and internal pivot, is engaged to the inner surface of the drum and covers momentarily the hole that moves to the point of contact between the drum and the wheel. The suction force is thus interrupted and the seed which is held against that hole is released and falls onto the soil.

A hobbyist gardener who needs to seed a small scale back-yard garden with small seeds such as carrot or lettuce seeds can appreciate the difficulty of attempting the task of distributing the seeds manually into prepared furrows. He can of course resort to pelletized seed or seed tape which are available commercially for limited seed varieties and at a substantially greater cost. The objective of the invention is to provide the small scale gardener the means for planting small seeds with ease. The invention uses the principle of vacuum seed pickup as described above but eliminates the need for a continuous vacuum source. The power is provided by the operator who guides a wheel along a prepared furrow and the wheel rotation in turn drives the rest of the mechanism. In addition, since small seed is often indistinguishable once deposited on the soil, it is a second objective of the invention to provide the operator with an electronic monitor that gives him the assurance that seeding is indeed taking place.

BRIEF DESCRIPTION OF THE DRAWINGS

The following drawings illustrate the preferred embodiment or parts thereof:

FIG. 2—Front view with the seed container removed.

FIGS. 5A, 5B, 5C,—Depicts the operation of the suction bellow.

FIG. 7—Illustrates the addition of a second bellow.

FIG. 8—Illustrates the addition of a second pickup aperture.

FIG. 9—Illustrates the configuration with a stationary bellow.

DESCRIPTION OF THE PREFERRED EMBODIMENT

Figure 1:
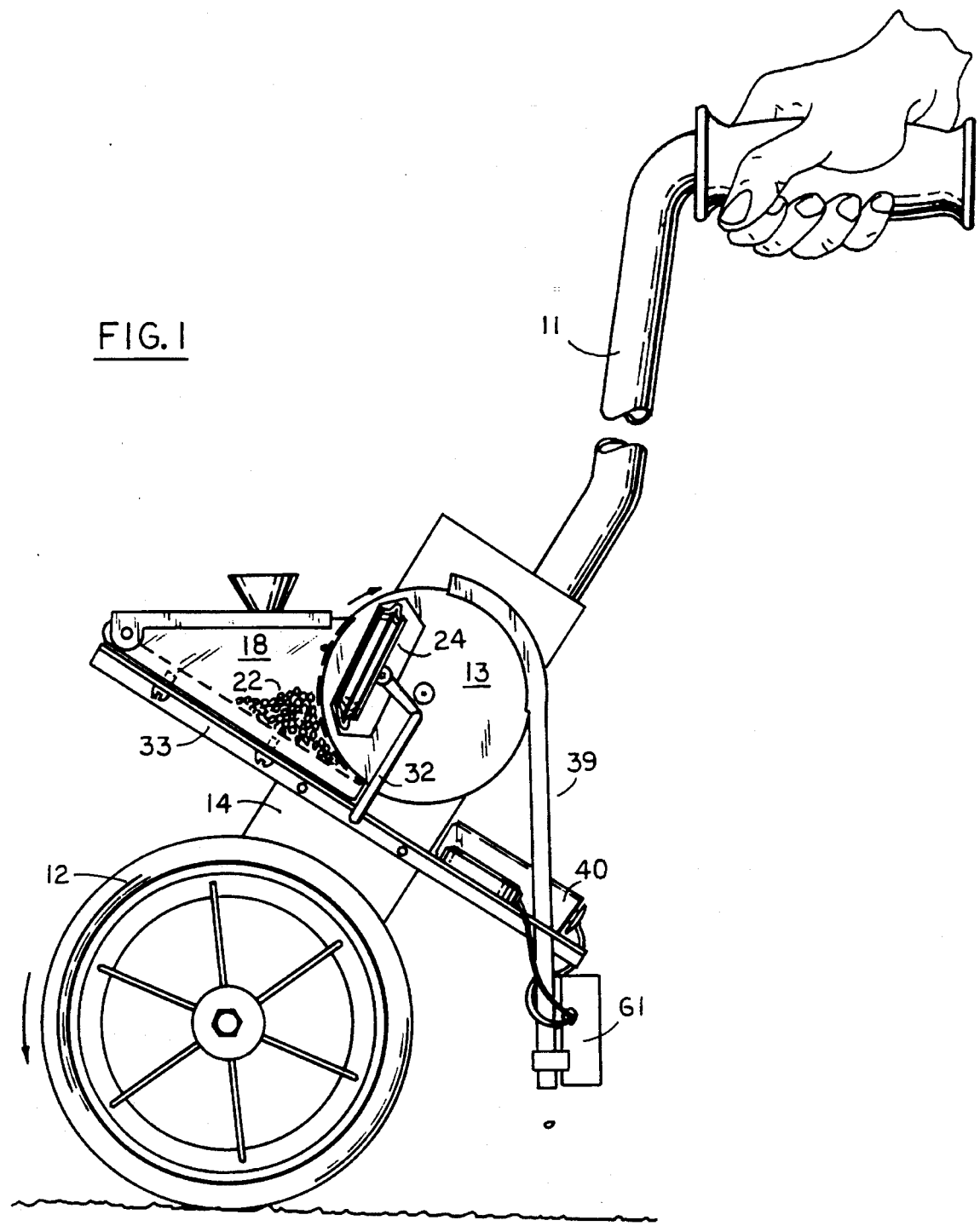
FIG. 1—General view of the seeder.
Figure 3:
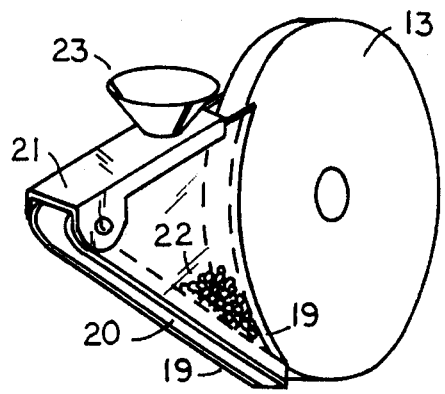
FIG. 3—Isometric view of the seed container.

With reference to FIGS. 1 and 2, the operator holding on to handle 11 guides the seeder along a prepared furrow and consequently wheel 12 rotates in the direction of the arrow. Wheel 12 and wheel 13 are mounted on chassis 14 and are coupled via belt 15 and pulleys 16 and 17. The belt and the pulleys are cogged to eliminate slippage. Belt 15 is twisted like the figure eight, thus transferring to wheel 13 rotation in the direction of the arrow next to it in FIG. 1. Seed-container 18 is detailed in FIG. 3. It is constructed of two transparent plastic walls 19, a sloping bottom 20 and a swivel cover 21. Wheel 13 fits closely in the slot formed by the two walls and the bottom, thus enclosing seeds 22. A gap larger than a single seed remains between wheel 13 and the edge of cover 21. Funnel 23 which extends through a hole in cover 21 facilitates loading the container with seeds.

Figure 4:
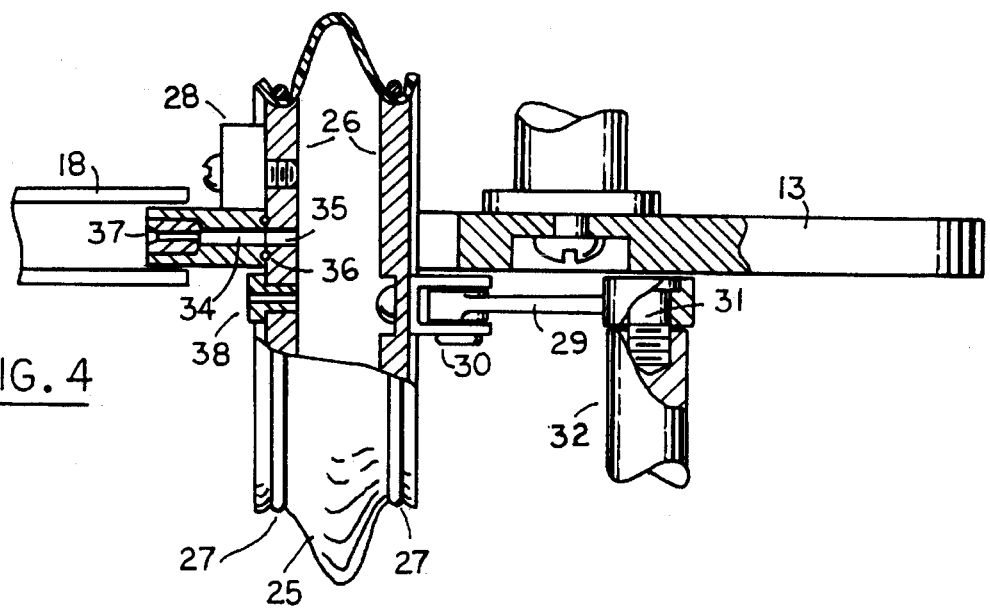
FIG. 4—Details the construction of the suction bellow.

With reference to FIGS. 4 and 5, the suction bellow 24, constructed of an elastic element 25 and two rigid disks 26 which are held together by compression rings 27, is mounted on wheel 13 inside a diamond shaped opening. One rigid disk 26 is attached to wheel 13 by means of screws through holes in bracket 28 and the other disk is made to oscillate back and forth as wheel 13 rotates, by means of a mechanism comprised of connecting rod 29 pivots 30 and 31 and arm 32. Arm 32 is attached to mounting bracket 33 which is riveted to chassis 14 as shown in FIG. 2. Arm 32 extends away from wheel 13, thus providing enough clearance for bellow 24 as it passes under the arm as shown in FIG. 5A. A radial hole 34 in wheel 13 is aligned with a hole 35 in disk 26 and an O-ring 36 provides a tight seal.

Again with reference to FIG. 5A, bellow 24 is shown in its most compressed position. As wheel 13 rotates, the bellow expands and as hole 34 enters the seed container 18 the rate of suction is sufficient for a single seed to be picked up. The picked up seed is carried upwards as shown in FIG. 5B. The seed is held in place until the suction stops, i.e. until the bellow is fully expanded as shown in FIG. 5C. As wheel 13 continues, the bellow contracts and instead of suction it provides an explosive flow of air which pushes the seed away. The seed is then already located inside the bent portion of duct 39 which guides the seed toward the ground as shown in FIG. 1. The passage of the seed is detected by electronic module 61 which produces an audible beep. Duct 39 is made of a square tube and is attached to bracket 33. The upper portion of the duct is bent and it has a slot in which wheel 13 fits, leaving enough clearance for the passage of the seed. To adapt the tool for different seeds, a replaceable constrictor 37 is inserted at the opening of hole 34 as shown in FIG. 4. The constrictor has a smaller orifice than the diameter of hole 34 and a flared opening to provide a better grip on the seed. In addition, a replaceable plug 38, having an orifice through which air leakage is allowed is provided as shown in FIG. 4. By selecting the correct orifice, the counteracting force exerted by the bellow on the drive mechanism is reduced to the minimum and the incidents of multiple seed pickup due to excessive suction force are also reduced.

Figure 6:
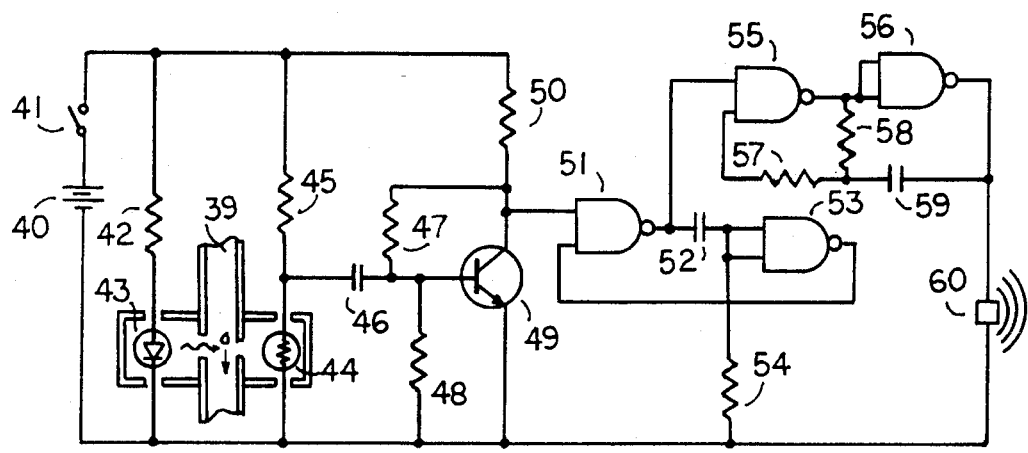
FIG. 6—The schematic of the seed detector.

With reference to FIG. 6. the operation of the electronic monitor will now be explained. As switch 41 is turned on current from battery 40 flows through resistor 42 and causes light-emitting-diode 43 to emit light which enters via a through-hole in duct 39 and falls on light detector 44 which is a cadmium-sulfide photo resistor. The current through detector 44 is set by resistor 45 and by the intensity of light from the emitting diode. As a seed falls down duct 39 it partially interrupts the light path between the emitter and the detector, causing a small change in the voltage across the detector. This voltage change is amplified by the amplifier circuit composed of capacitor 46 resistors 47, 48, 50 and transistor 49. The amplified voltage swing at the collector of transistor 49 is enough to trigger the monostable flip-flop circuit composed of AND-gates 51, 53, capacitor 52 and resistor 54. The monostable flip-flop produces an approximately 0.1 second enable signal to the free-running flip-flop composed of AND-gates 55, 56, resistors 57, 58 and capacitor 59. The free-running flip-flop feeds the piezoelectric loudspeaker 60 with a tone signal of approximately 2000 Hz. Thus, every time a seed is deposited, an audible beep of 0.1 second duration is produced, giving the operator the confidence that seeding is taking place.

SUMMARY AND RAMIFICATIONS

For the new invention to operate smoothly it is required that the ground engaging wheel 12 roll easily over a worked garden soil. Therefore, the diameter of this wheel cannot be arbitrarily small. A diameter of approximately 6 inches is the optimum size for wheel 12. This means that the wheel traverses approximately 18 inches for each complete rotation. Since the distance between seeds as required for most seeding operation is much shorter, i.e. 2 to 6 inches, and since the new seeder as described previously deposits a single seed for every turn of wheel 13, it follows that the coupling ratio between wheel 12 and wheel 13 must be as high as 9:1. If we assume for this discussion that the coupling ratio is 9:1 and that a reasonable slowest walking speed for the operator is 1.5 feet/second, it follows that wheel 13 will rotate approximately 9 revolutions per seconds. At that speed no seed pickup is possible because of the inertia of the seed. Experiments showed that for efficient operation, the rotation speed of wheel 13 with a diameter of approximately 4 inches is limited to 3 revolutions per second. In order to increase the density of deposited seeds, it is possible that the operator will run over the same furrow more than once; each time with a slight off-set to the starting point. Alternatively the seeder can be modified as follows:

1. With reference to FIG. 7, two or more suction elements 24 can be mounted on the same wheel 13, coupled by a separate connecting rod 29 to a single pivotal point. Each suction element is thus made to contract and expand once every rotation, proportionally increasing the number of seeds deposited per rotation.

2. With reference to FIG. 8, the suction bellow has two suction ports 37 in close proximity thus picking up and depositing seed in pairs for each rotation of wheel 13. This method does not offer uniform distribution, but this is not a limitation since most crops are planted at a high density in order to allow thinning after the seedlings emerge. Statistically, thinning after planting in pairs also results in adequate uniformity in plant distribution.

If modifications (1) and (2) above are combined, it gives the operator the flexibility to select a seeding density by enabling only part of the suction ports and plugging the rest and without changing the coupling ratio between wheels 12 and 13.

Although in the preferred embodiment the suction element 24 is mounted on wheel 13, an embodiment in which the suction element is mounted on chassis 14 is within the scope of the new invention. Such an embodiment is depicted in FIG. 9. A tube 62 connects the suction element to the radial hole 34 in wheel 13 by means of a rotary seal bushing 63. The oscillatory motion to the suction element is conveyed by means of connecting rod 64 mounted on an off-center pivot 65.

Also, within the scope of this invention are all the embodiments which employ suction elements that are based on a piston inside a cylinder instead of an elastic bellow, and all the embodiments which employ mechanical gear coupling instead of a cogged belt and pulleys.

What is claimed as a new invention is:

1. A tool for seeding crop seeds in prepared furrow comprising a chassis supporting a first ground engaging wheel, a second wheel, and a seed container holding seeds, said chassis adapted to be held and moved thus transferring rolling motion to said first wheel, first mechanical coupling means between said first wheel and said second wheel to transfer the rolling motion of said first wheel to a rotational motion of said second wheel, said second wheel in contact with said seeds through a slot in said container, a suction aperture having a size smaller than a single seed at the circumference of said second wheel and in communication with a suction bellow mounted on said second wheel, second mechanical coupling means between said bellow and said chassis to translate the rotation of said second wheel into an oscillatory expansion and contraction motion of said bellow, said expansion motion prevailing when said suction aperture is within said seed container causing suction which picks up seed, the picked seed is carried upwards and outside said container by the motion of said second wheel, said contraction motion prevailing when said suction aperture is outside said seed container causing expulsion which releases the picked seed, said seed received by a duct, said duct guides the seed downwards to the soil.

2. A tool as in claim 1 and further including an electronic seed detector mounted near the exit opening of said duct, said detector producing a short audible beep for every deposited seed.

3. A tool for seeding crop seeds in prepared furrow comprising a chassis supporting a first ground engaging wheel, a second wheel, a suction bellow and a seed container holding seeds, said chassis adapted to be held and moved thus transferring rolling motion to said first wheel, first mechanical coupling means between said first wheel and said second wheel to transfer the rolling motion of said first wheel to a rotational motion of said second wheel, said second wheel in contact with said seeds through a slot in said container, a suction aperture having a size smaller than a single seed at the circumference of said second wheel, suction coupling means including a rotary seal between said suction aperture and said bellow, second mechanical coupling means between said bellow and said second wheel to translate the rotation of said second wheel to an oscillatory expansion and contraction motion of said bellow, said expansion motion prevailing when said suction aperture is within said seed container causing suction which picks up seed, the picked seed is carried upwards and outside said container by the motion of said second wheel, said contraction motion prevailing when said suction aperture is outside said seed container causing expulsion which releases the picked seed, said seed received by a duct, said duct guides the seed downwards to the soil.

4. A tool as in claim 3 and further including an electronic seed detector mounted near the exit opening of said duct, said detector producing a short audible beep for every deposited seed.

\* \* \* \* \*